Figure 1:
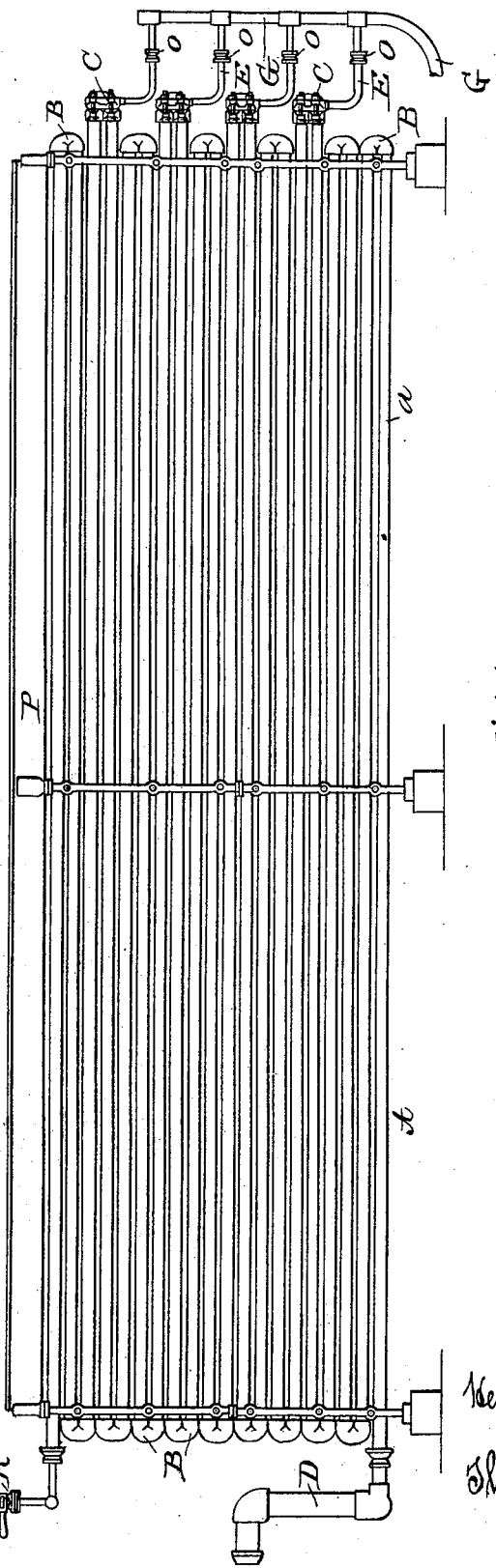

(No Model.) 4 Sheets—Sheet 1.

H. RASSBACH.
CONDENSER.

No. 507,039. Patented Oct. 17, 1893.

Witnesses:
Arthur Ashley
Henry F. Cooper

Inventor:
Hermann Rassbach
by Thomas J. Johnston
Attorney.

(No Model.) 4 Sheets—Sheet 2.
H. RASSBACH.
CONDENSER.
No. 507,039. Patented Oct. 17, 1893.
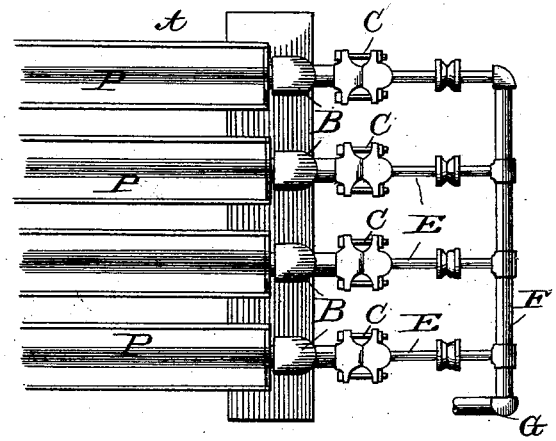
Fig. 3.
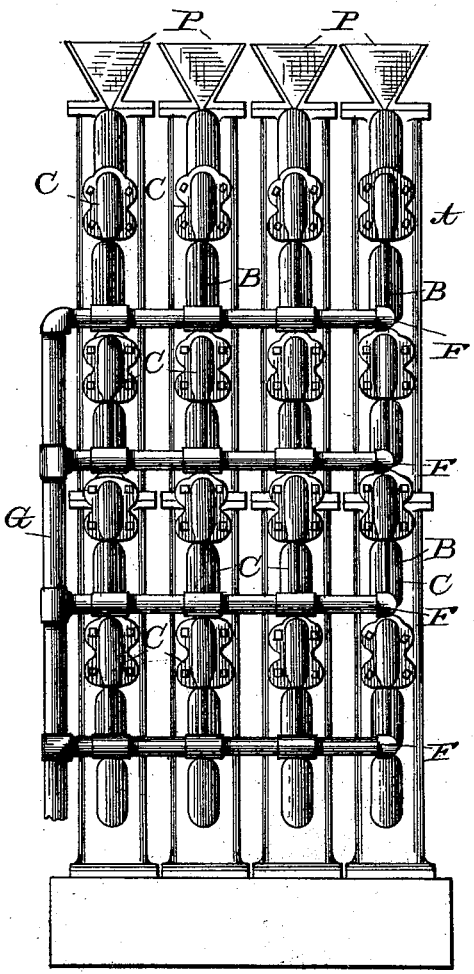
Fig. 2.
Fig. 4.
Witnesses:
Arthur Ashley
Henry E. Cooper
Inventor:
Hermann Rassbach
by Thomas J. Johnston,
Attorney.

(No Model.) 4 Sheets—Sheet 3.

H. RASSBACH.
CONDENSER.

No. 507,039. Patented Oct. 17, 1893.

Witnesses:
Arthur Ashley
Henry C. Cooper

Inventor:
Hermann Rassbach
by Thomas J. Johnston,
Attorney.

(No Model.)  
H. RASSBACH.  
CONDENSER.

No. 507,039. Patented Oct. 17, 1893.

4 Sheets—Sheet 4.

Witnesses:
Arthur Ashley
Henry E. Cooper

Inventor:
Hermann Rassbach
by
Thomas J. Johnston,
Attorney.

UNITED STATES PATENT OFFICE.

HERMANN RASSBACH, OF WASHINGTON, DISTRICT OF COLUMBIA.

CONDENSER.

SPECIFICATION forming part of Letters Patent No. 507,039, dated October 17, 1893.

Application filed September 26, 1891. Serial No. 406,897. (No model.)

*To all whom it may concern:*

Be it known that I, HERMANN RASSBACH, mechanical engineer, a citizen of the United States, residing at Washington city, in the District of Columbia, have invented certain new and useful Improvements in Condensers, of which the following is a specification.

My invention relates to condensers, such as are used in condensing vapors by cooling and pressure into liquid, and more particularly to such as are employed in the condensation of ammonia or other gas in the manufacture of ice or similar processes of refrigeration; and consists, briefly, in a method of eliminating air from the circuit and particularly from the condenser; further, in providing pipes which bring all parts of the condenser into communication each with the other, thus equalizing the pressure therein; further, in an arrangement of pipes for removing the liquid ammonia from the condenser, by which the circulation of gas is accelerated and the capacity of the condenser increased; further, in arranging the ammonia-drainage-pipes so that the joints project beyond the flow of water, and are accessible for inspection; and lastly, in sundry improvements in the pipe-fittings of the condenser, whereby some of the objects named are rendered possible, and whereby the removal of pipe-sections is facilitated.

It is well-known that condensing efficiency (in the case of a homogeneous gas) is dependent upon two factors, temperature and pressure: that is to say, as the temperature falls, the pressure necessary to effect condensation falls also. It is also known that the cold and pressure necessary to condense different gases varies with their physical constitution, for unknown reasons. Among the most difficult of all gases to liquefy are oxygen and nitrogen, and their mixture in the atmosphere it is practically impossible to condense. For these reasons it is of prime importance to prevent the admission of air into an ammonia circuit, and to provide for the segregation and expulsion of such as may intrude. So great is its effect in increasing the work of condensation, that a small percentage of air in the circuit will not only raise the condensing pressure, but at the same time greatly raise the temperature of the condensed liquid.

The drawings which are attached to and hereby made a part of this specification show a method of embodying my invention, while the elements of novelty are more particularly designated in the claims.

Figure 6:
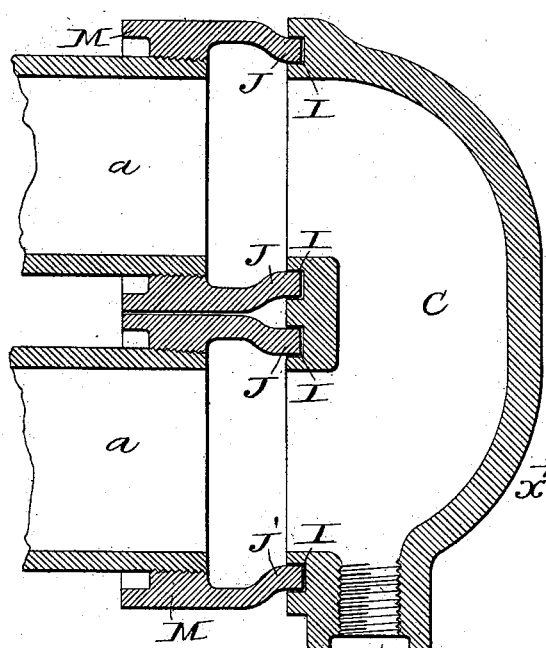
Figure 5:
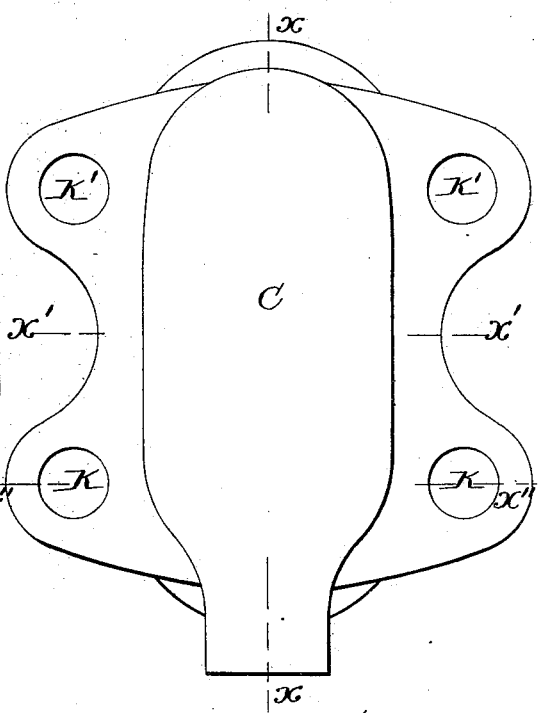
Figure 7:
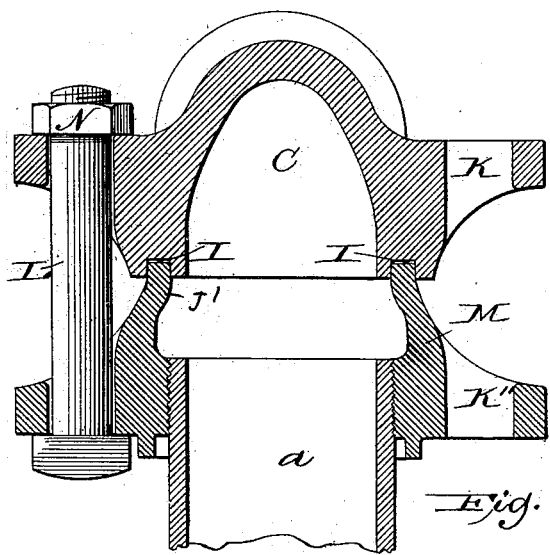
Figure 8:
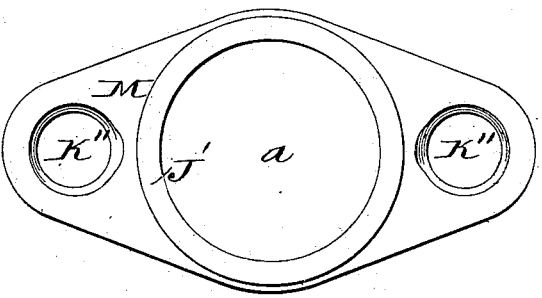
Figure 9:
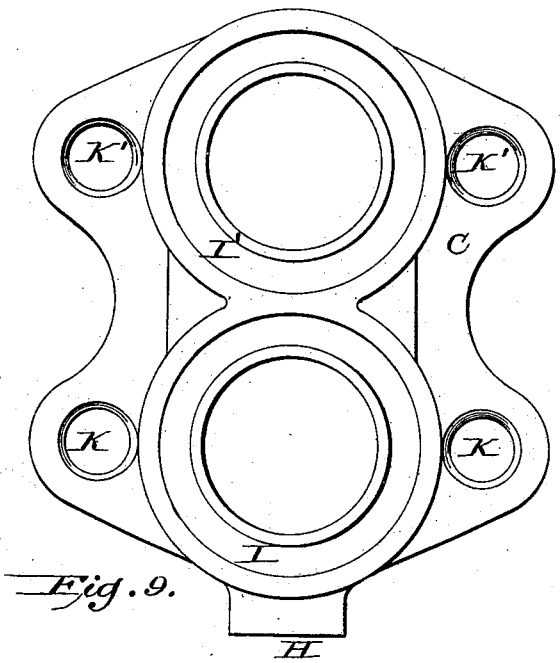
Figure 10:
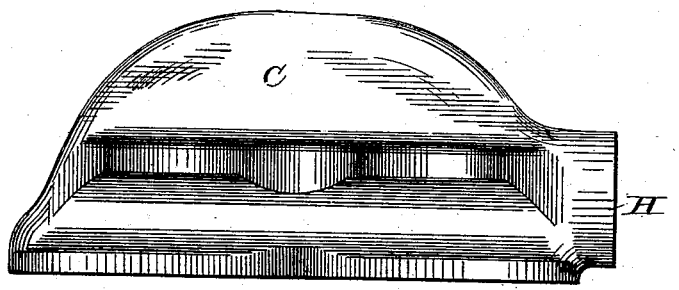
Figure 11:
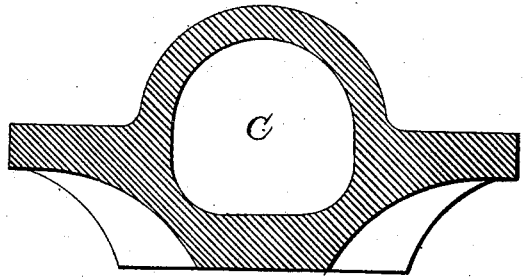

In the said drawings, Figure 1— represents a side elevation, Fig. 2— represents an end elevation, looking to the left on Fig. 1, and Fig. 3— represents a plan, of a condenser built in accordance with my invention. Fig. 4— is an elevation of the air-valve. Fig. 5— is an end view of an improved pipe-fitting, more particularly described hereinafter. Fig. 6— is a section through X X, Fig. 5—. Fig. 7— is a section through $X'' \ X''$, Fig. 5—. Fig. 8— is a front elevation of the flange, by means of which the pipes are connected to the fitting. Fig. 9— is a rear elevation and Fig. 10— a side elevation of the fitting shown in Fig. 5—. Fig. 11— is a section through $X'\ X'$ Fig. 5—.

A represents the condenser, composed of the pipes $a\ a$, made preferably of mild steel, which best resists the pressure. I have preferred to illustrate a battery of four of such condensers; though it is manifest that they may be more or less in number as occasion requires, there being no practical limit to duplication as in other forms of such apparatus, on account of the system of equalizers and the air-valve, which keep the pressure equal in any number that may be selected.

The pipes $a\ a$ are connected at their rear ends by the standard return bends B B, and at their front ends by similar bends; but at appropriate intervals I substitute for these standard bends the improved fittings, C C, provided each with a drainage-pipe E, whereby the liquid ammonia which forms in the condenser is conveyed away and forms no impediment to the circulation of the ammonia gas. These pipes connect with the horizontal liquid manifolds F F, which in turn connect with the vertical manifold G.

In the arrangement illustrated, the first connection C is introduced at the fifth pipe from the bottom, and others at every fourth pipe thereafter. There may be two or more vertical manifolds if needful.

It will be seen that the system of drainage-pipes adopted provides a perfect pressure equalizer. Should there be a point of low pressure in the condenser, the gas will immediately flow toward it through these pipes from other points of higher pressure, and equilibrium will be restored.

The fittings C C are properly speaking, flanged return-bends, and are illustrated in Figs. 6— to 11— of the drawings. Each of the pipes $a$ $a$, which it is proposed to connect by this bend, is first screwed into the edge of a flange M, (illustrated in Fig. 8—) taking care to bring the bolt-holes into horizontal line. A lead ring-gasket is then placed in each of the channels I I'; the ring-flanges J J' are then inserted in the channels I I', or more correctly, the fitting C is placed over the ends of the pipes; bolts L are passed through the bolt-holes K K' K'', and made fast with nuts N, thus securely locking the parts together, while affording a joint which can be easily separated, if desired, for repairs or the removal of a pipe.

By reference to Fig. 1, it will be seen that the pipes E E, after dropping out of line with the pipes $a$ $a$, are connected to the horizontal manifold by the thimbles O O, thus facilitating removal of the fitting C. It will also be observed that the pipes provided with flange-bends project for several inches beyond the standards supporting the condenser.

Owing to the great capacity of water for absorbing ammonia, so long as a leaky joint is under the flow from the trough P, which is of the same length as the shorter condensing-pipes, the leakage will be undetected, and waste will ensue. By removing these joints from the action of the water in the manner indicated, they can be under constant inspection while the condenser is running, and any odor will at once attract attention.

The air-valve illustrated in Fig. 4 consists of a suitable chamber Q, provided with a cock R in the pipe connecting it with the condenser, and a similar cock S in the pipe opening into the air. The cock R is left open, whereupon the ammonia gas enters and fills the chamber Q. Any air that may be in or may enter the circuit flows along with the ammonia gas toward the top of the condenser, and enters the chamber Q. As the pressure increases in this chamber, the ammonia gas is liquefied and runs out, leaving only the air. From time to time the engineer opens the cock S and releases the air, after closing the cock R. To insure the entire expulsion of the air, the cock R is then opened slightly, and when the bluish vapor of ammonia appears, the cock S is closed and the cock R is opened till another accumulation of air necessitates a repetition of the operation. The air-chamber must be placed above the top pipe of the condenser.

It is essential for various economical reasons that the gas should flow in a contrary direction to the cooling medium, and it is therefore led into the bottom pipe of the condenser through the main D at the left of Fig. 1, from whence it flows upward; the last outlet for products of condensation being at the top one of the flange-bends C C.

It is manifest that many changes may be made in the general arrangement here shown; if, for instance, the plant is a small one, but a single condenser may be needed, in which event the drainage-pipes would be connected directly to the vertical header G, and similar changes made; all of which I aim to embrace.

Having thus described my invention, what I claim, and wish to protect by Letters Patent of the United States, is—

1. In a condenser for ammonia gas or similar fluids, a series of condensing-pipes provided at suitable intervals with separable couplings having drainage-pipes; the drainage-pipes provided with a second joint out of line with the condensing-pipes joined by the separable coupling, whereby the removal thereof is facilitated, substantially as described.

2. In a condenser for ammonia gas or similar fluids, a series of condensing-pipes having at proper intervals separable couplings secured together by bolts and provided with drainage-pipes communicating with a common manifold or header, substantially as described.

3. In a condenser for ammonia gas or similar fluids, two or more series of condensing pipes, the pipes in each series united at similar suitable intervals by separable couplings provided with drainage pipes connected to a common manifold, substantially as described.

4. In a condenser for ammonia gas or similar fluids, a series of condensing pipes connected at proper intervals by separable couplings composed of flanges M and return bends C provided with necks H, means for clamping together said last mentioned parts, drainage pipes E connected with said necks, and means for cooling the exteriors of said condensing pipes, substantially as described.

5. In a condenser for ammonia gas or similar fluids, condensing pipes A arranged in a series, separable couplings composed of flanges M and return bends C secured together by bolts and nuts and connecting said pipes at alternate ends, the flanges being provided with rings J adapted to register with grooves in the return bends, and means for cooling the exteriors of said condensing pipes, substantially as described.

6. In a condenser for ammonia gas or similar fluids, condensing pipes connected at intervals by separable couplings composed of flanges M and return bends C secured together by bolts and nuts, the flanges being provided with rings J adapted to register with grooves in the return bends, and the bends having threaded necks for drainage pipes, the drainage pipes E, and means for cooling the exteriors of said condensing pipes, substantially as described.

7. In a condenser the combination of a series of pipes a arranged one above the other, flanges M on the ends of said pipes, return bends C having grooves I I' in which the flanges of certain of said pipes are situated so as to connect the latter one with the other in series at alternate ends, means for clamping together said flanges and return-bends, a common manifold or header and drainage pipes connecting said return-bends therewith, substantially as described.

In witness whereof I have hereunto set my hand in the presence of two witnesses.

HERMANN RASSBACH.

Witnesses:
HENRY E. COOPER,
MARGARET V. COOPER.